United States Patent
Xiong et al.

(10) Patent No.: US 12,463,252 B2
(45) Date of Patent: Nov. 4, 2025

(54) ADDITIVE FOR ELECTROLYTE, ELECTROLYTE, AND ELECTROCHEMICAL DEVICE

(71) Applicant: Hithium Tech HK Limited, Kowloon (HK)

(72) Inventors: Chaojie Xiong, Xiamen (CN); Min Guo, Xiamen (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 645 days.

(21) Appl. No.: 17/813,978

(22) Filed: Jul. 21, 2022

(65) Prior Publication Data
US 2023/0109679 A1  Apr. 13, 2023

(30) Foreign Application Priority Data
Jul. 21, 2021  (CN) .......................... 202110824371.1

(51) Int. Cl.
| | |
|---|---|
| *H01M 10/0567* | (2010.01) |
| *H01M 4/04* | (2006.01) |
| *H01M 10/0525* | (2010.01) |
| *H01M 10/0568* | (2010.01) |
| *H01M 10/0569* | (2010.01) |
| *H01M 50/46* | (2021.01) |

(52) U.S. Cl.
CPC ..... *H01M 10/0567* (2013.01); *H01M 4/0404* (2013.01); *H01M 10/0525* (2013.01); *H01M 10/0568* (2013.01); *H01M 10/0569* (2013.01); *H01M 50/46* (2021.01); *H01M 2300/0051* (2013.01)

(58) Field of Classification Search
CPC ......... H01M 10/0567; H01M 10/0525; H01M 10/0568; H01M 10/0569; H01M 50/46; H01M 2300/0051
See application file for complete search history.

(56) References Cited

U.S. PATENT DOCUMENTS

| | | | | |
|---|---|---|---|---|
| 5,326,884 | A | * 7/1994 | Urban | ................ C07D 333/48 549/66 |
| 2010/0018034 | A1 | * 1/2010 | Miyasaka | ............. H01M 4/505 29/623.1 |
| 2012/0171542 | A1 | * 7/2012 | Matsumoto | ........... H01M 4/525 429/105 |
| 2017/0271715 | A1 | * 9/2017 | Kim | ................. H01M 10/0567 |
| 2021/0313624 | A1 | * 10/2021 | Morinaka | ......... H01M 10/0567 |

* cited by examiner

*Primary Examiner* — Matthew J Merkling
(74) *Attorney, Agent, or Firm* — Hodgson Russ LLP

(57) ABSTRACT

The present disclosure provides an additive for an electrolyte for a lithium battery, an electrolyte, and an electrochemical device. The additive includes a compound represented by the following formula I, wherein $R_1$, $R_2$, $R_3$, and $R_4$ are identical to or different from each other, and are independently selected from a group consisting of hydrogen, halogen, substituted or unsubstituted $C_1$-$C_{20}$ alkyl, and substituted or unsubstituted $C_6$-$C_{18}$ aryl, and a substituent of the substituted or unsubstituted $C_1$-$C_{20}$ alkyl or the substituted or unsubstituted $C_6$-$C_{18}$ aryl can be halogen, $C_1$-$C_{20}$ alkyl, or $C_6$-$C_{18}$ aryl; wherein ------ denotes a single bond or a double bond; and wherein n is 1 or 2.

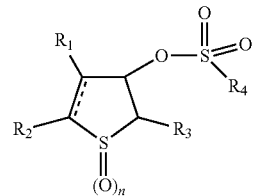

(I)

13 Claims, No Drawings

ADDITIVE FOR ELECTROLYTE, ELECTROLYTE, AND ELECTROCHEMICAL DEVICE

CROSS-REFERENCE TO RELATED APPLICATION

This application claims priority to China Patent Application No. 202110824371.1, filed on Jul. 21, 2021, entitled "ADDITIVE FOR ELECTROLYTE FOR LITHIUM BATTERY, ELECTROLYTE, AND ELECTROCHEMICAL DEVICE", the content of which is hereby incorporated by reference in its entirety.

TECHNICAL FIELD

The present disclosure relates to the field of electrochemical battery, and in particular to an additive for an electrolyte, an electrolyte containing the additive, and an electrochemical device.

BACKGROUND

A lithium battery is a type of secondary battery (i.e., rechargeable battery). The operation of the lithium battery mainly depends on the movement of lithium ions ($Li^+$) between a cathode and an anode thereof. During the charging process of the lithium battery, $Li^+$ is de-intercalated from the cathode and intercalated into the anode through an electrolyte, so that the anode is in a lithium-rich state and the conversion from the electrical energy to the chemical energy is achieved, while the discharging process is just the opposite.

Compared with a lead-acid battery, a nickel-metal hydride battery, and a nickel-cadmium battery, the lithium battery has the advantages of relatively high operating voltage, high energy density, environmental friendliness, and long cycling life, and thus has been widely used as a 3C (computer, communication, and consumer electronics) consumer battery, a power battery, an energy storage battery, etc. For example, at present, the lithium batteries have been comprehensively applied in the fields such as mobile communication equipment (such as mobile phones), 5G base stations, two or three-wheeled electromobiles, ships, passenger vehicles, cars, large energy-storage power-stations, etc., and also have a broad application prospect in the fields such as aerospace, national defense, military industry, etc. However, in some fields, the requirements on the performances of the lithium batteries, such as high and low temperature performances, cycling performance, and safety performance, are relatively strict. The electrolyte is one of the key factors determining these performances, since it is the only one material that is in contact with all of the cathode, the anode, and the separator of the lithium battery. The electrolyte plays an important role in determining the specific capacity, operating temperature range, cycling efficiency, and safety performance of the battery. At present, the commercialized lithium batteries generally use carbon materials such as graphite and mesocarbon microspheres (MCMB), or silicon materials such as silicon oxide as the anode materials of the batteries, and use the materials such as $LiCoO_2$, $LiMn_2O_4$, NCM, NCA, and $LiFePO_4$ as the cathode materials of the batteries. The separator made of the material such as porous polyethylene (PE) or polypropylene (PP) is interposed between the anode and the cathode. Finally, a mixed solution containing a nonaqueous organic solvent and an electrolyte lithium salt is injected into the battery shell as an electrolyte liquid to complete the fabrication of the lithium battery.

In recent years, in order to increase the energy density of the battery, a high-voltage system has been studied, which increases the energy density by increasing the operating voltage of the battery. However, the high voltage raises higher requirements on the electrolyte. Therefore, a high voltage electrolyte should be deployed correspondingly. The electrolytes of the current commercialized systems, specifically the power battery and the energy storage battery, generally have an operating voltage of 4.2 V. If the voltage is further increased, the electrolytes will be oxidatively decomposed at the cathodes and generate a large amount of gas, resulting in significant deterioration of the performance of the batteries. At present, to address the above-described problem, sulphone compounds are generally added as additives into the electrolytes to improve the performance of the batteries at the high voltage. However, at present, no suitable sulphone additive has been found to achieve sufficiently satisfactory effect.

SUMMARY

The present disclosure provides an additive for an electrolyte, an electrolyte, and an electrochemical device. The electrolyte additive can inhibit gas generation phenomenon of the electrolyte at a relatively high temperature and a relatively high operating voltage, so that the electrolyte maintains a relatively high cycling stability. The electrolyte additive can allow the corresponding lithium battery to still have a relatively high cycling capacity retention rate after hundreds of charge-discharge cycles. Moreover, the electrolyte additive can effectively improve the safety of the lithium battery in case of overcharge.

In a first aspect, the present disclosure provides an additive for an electrolyte. The additive includes a compound represented by the following formula I:

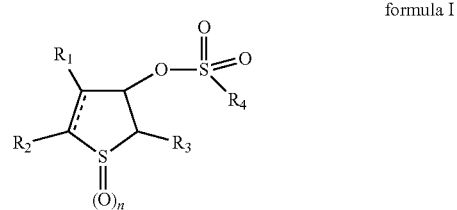

formula I wherein $R_1$, $R_2$, $R_3$, and $R_4$ can be identical to or different from each other, and can be independently selected from a group consisting of hydrogen, halogen, substituted or unsubstituted $C_1$-$C_{20}$ alkyl, and substituted or unsubstituted $C_6$-$C_{18}$ aryl, and a substituent of the substituted or unsubstituted $C_1$-$C_{20}$ alkyl or the substituted or unsubstituted $C_6$-$C_{18}$ aryl can be halogen, $C_1$-$C_{20}$ alkyl, or $C_6$-$C_{18}$ aryl;

wherein ------ denotes a single bond or a double bond; and wherein n is 1 or 2.

In the first aspect, in a practicable embodiment, $R_1$, $R_2$, $R_3$, and $R_4$ can be independently selected from a group consisting of hydrogen, fluorine, chlorine, methyl, ethyl, propyl, isopropyl, phenyl, methylphenyl, dimethylphenyl, trimethylphenyl, and ethylphenyl.

In a second aspect, the present disclosure provides an electrolyte. The electrolyte includes a lithium salt, an organic solvent, and the additive according to the first aspect.

In the second aspect, in a practicable embodiment, a concentration of the additive in the electrolyte can be 1.0 wt % to 3.0 wt %, for example, 2.0 wt %.

In the second aspect, in a practicable embodiment, the lithium salt can include lithium hexafluorophosphate ($LiPF_6$), lithium tetrafluoroborate ($LiBF_4$), lithium bis(oxalate)borate (LiBOB), lithium difluorophosphate ($LiF_2PO_2$), lithium bis(fluorosulfonyl)imide (LiFSI), lithium bis(trifluoromethylsulfonyl)imide (LiTFSI), lithium difluoro(oxalato)borate (LiODFB), lithium difluorobis(oxalato)phosphate (LiODFP), or any combination thereof.

In the second aspect, in a practicable embodiment, the concentration of the lithium salt in the electrolyte can be 0.8 mol/L to 1.2 mon.

In the second aspect, in a practicable embodiment, the organic solvent can include carbonate ester, carboxylate ester, fluorocarboxylate ester, or any combination thereof.

The carbonate ester can include dimethyl carbonate, diethyl carbonate, ethylene carbonate, propylene carbonate, ethylmethyl carbonate, butylene carbonate, methylpropyl carbonate, or any combination thereof.

The carboxylate ester can include ethyl formate, ethyl acetate, propyl acetate, butyl acetate, propyl propionate, butyl propionate, ethyl butyrate, methyl formate, ethyl propionate, or any combination thereof.

The fluorocarboxylate ester can include ethyl fluoroformate, ethyl fluoroacetate, propyl fluoroacetate, butyl fluoroacetate, ethyl fluoropropionate, propyl fluoropropionate, butyl fluoropropionate, ethyl fluorobutyrate, methyl fluoroformate, or any combination thereof.

In the second aspect, in a practicable embodiment, the electrolyte can further include a film-formation additive. The film-formation additive can include fluoroethylene carbonate (FEC), 1,3-propanesultone (PS), 1,4-butanesultone (BS), and vinylene carbonate (VC), or any combination thereof.

In the second aspect, in a practicable embodiment, the concentration of the film-formation additive in the electrolyte can be 0.2 wt % to 4.0 wt %.

In a third aspect, the present disclosure provides an electrochemical device including a cathode, an anode, a separator, and an electrolyte.

The cathode includes a cathode current collector and a cathode active material layer disposed on a surface of the cathode current collector.

The anode includes an anode current collector and an anode active material layer disposed on a surface of the anode current collector.

The separator is disposed between the cathode and the anode.

The electrolyte can be the electrolyte according to the second aspect of the present disclosure.

The electrochemical device can be a lithium battery.

In the third aspect, in a practicable embodiment, the cathode active material layer can include a cathode active material, a binder, and a conducting agent.

The cathode active material can include lithium cobalt oxide ($LiCoO_2$), lithium nickel cobalt manganese oxide (NCM), lithium nickel cobalt aluminum oxide (NCA), lithium iron phosphate, lithium manganese iron phosphate, lithium manganate, or any combination thereof.

In the third aspect, in a practicable embodiment, the anode active material layer can include an anode active material, a binder, and a conducting agent.

The anode active material can include lithium metal or lithium metal alloy compound, carbon material, graphite material, silicon carbon material, silicon material, silicon oxygen material, or any combination thereof.

The present disclosure further provides an electrical device including the electrochemical device according to the third aspect of the present disclosure.

The embodiments of the present disclosure at least has the following beneficial effect as compared to the prior art.

The electrolyte additive according to the present disclosure for improving the high and low temperature performances of the lithium battery can increase the discharge capacity retention rate and the cycling capacity retention rate of the lithium battery containing the same at high and low temperatures. As compared to a lithium battery without adding the above electrolyte additive, the lithium battery according to the present disclosure can effectively alleviate the decreases of the discharge capacities at high temperature (e.g., 55° C.) and low temperature (e.g., −20° C.) with respect to normal temperature (e.g., 25° C.). Moreover, the lithium battery according to the present disclosure can maintain a relatively high cycling capacity retention rate during both 300 charge-discharge cycles at high temperature (e.g., 55° C.) and 250 charge-discharge cycles at low temperature (e.g., −20° C.).

The electrolyte liquid of the lithium battery containing the electrolyte additive according to the present disclosure can maintain a relatively high cycling stability even at the relatively high temperature (e.g., 45° C.) and the relatively high operating voltage (e.g., charging voltage of 4.5 V), without obvious gas generation phenomenon occurring, so that the corresponding lithium battery can still have a relatively high cycling capacity retention rate after hundreds of charge-discharge cycles. Moreover, the safety of the lithium battery in case of overcharge can be effectively improved.

DETAILED DESCRIPTION

For a clear understanding of the technical features, objects, and effects of the present disclosure, specific embodiments of the present disclosure are described in detail as follows. It is to be understood that the following description is merely exemplary embodiments of the present disclosure, and is not intended to limit the scope of the present disclosure.

In a first aspect, the present disclosure provides an embodiment of an additive for an electrolyte. The electrolyte additive includes a compound represented by the following formula formula I

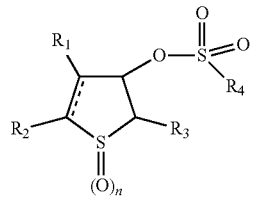

wherein $R_1$, $R_2$, $R_3$, and $R_4$ can be identical to or different from each other, and can be independently selected from a group consisting of hydrogen, halogen, substituted or unsubstituted $C_1$-$C_{20}$ alkyl, and substituted or unsubstituted $C_6$-$C_{18}$ aryl, wherein a substituent of the substituted or unsubstituted $C_1$-$C_{20}$ alkyl or the substituted or unsubstituted $C_6$-$C_{18}$ aryl can be halogen, $C_1$-$C_{20}$ alkyl, or $C_6$-$C_{18}$ aryl;

wherein ------ denotes a single bond or a double bond; and wherein n is 1 or 2.

In the embodiment of the present disclosure, by adding the electrolyte additive including the sulfone or sulfoxide compound represented by formula I according to the present disclosure into an electrolyte liquid of a lithium battery, the electrochemical window of the electrolyte liquid can be effectively expanded, so that the oxidation resistance of the electrolyte liquid, especially the organic solvent contained therein, at a relatively high operating voltage can be increased. The electrolyte additive can react and generate a decomposition product such as lithium sulfate or lithium fluoride on a surface of the cathode at a high voltage, thereby forming a passivation layer, which enhances the cycling stability of the cathode material at a high temperature and a high voltage. Moreover, the passivation layer, which acts as a stable protective film, can separate the electrode from the electrolyte liquid without affecting the conduction of the lithium ions. The passivation layer reduces the amount of metal elements such as transition metals dissolved from the cathode, and particularly, effectively inhibits gas generation caused by the oxidative decomposition of the organic solvent in the electrolyte liquid at the relatively high operating voltage. In addition, the electrolyte additive can also form the decomposition product such as lithium sulfite on the anode, so that the interfacial film on the anode can be stabilized, and the voltage increase in the overcharge of the lithium battery can be slowed down due to the relatively large resistance of a CEI/SEI film. Therefore, the electrolyte additive can effectively inhibit gas generation caused by decomposition of the solvent in the electrolyte liquid at the high voltage, and thus can prevent smoking, burning, and explosion. Furthermore, the flame retardancy of the electrolyte liquid is further increased by adding the above-described electrolyte additive.

Thus, the electrolyte liquid of the lithium battery containing the electrolyte additive can maintain a relatively high cycling stability even at a relatively high temperature and a relatively high operating voltage, without obvious gas generation phenomenon occurring, so that the corresponding lithium battery can still have a relatively high cycling capacity retention rate after hundreds of charge-discharge cycles. Moreover, the safety of the lithium battery in overcharge can be effectively improved.

Further, $R_1$, $R_2$, $R_3$, and $R_4$ can be independently selected from a group consisting of hydrogen, fluorine, chlorine, methyl, ethyl, propyl, isopropyl, phenyl, methylphenyl, dimethylphenyl, trimethylphenyl, and ethylphenyl. The above-described groups allow the electrolyte additive according to the present disclosure to play a better role in maintaining the stability of the electrolyte liquid at a relatively high operating voltage and in inhibiting the gas generation phenomenon.

In a second aspect, the present disclosure provides an electrolyte liquid. The electrolyte liquid includes an electrolyte lithium salt, an organic solvent, and the electrolyte additive according to the above first aspect.

The electrolyte liquid obtained by adding the electrolyte additive according to the present disclosure has a relatively high electrochemical window, and can maintain a good stability even at a relatively high operating voltage, without obvious gas generation phenomenon occurring, so that the lithium battery containing the electrolyte liquid can still have a relatively high cycling capacity retention rate after hundreds of charge-discharge cycles.

Further, in the electrolyte liquid for the lithium battery according to the present disclosure, the concentration of the electrolyte additive can be in a range of 1.0 wt % to 3.0 wt %, for example, can be 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, or 3.0 wt %, or any other specific value in the above range. The electrolyte additive according to the present disclosure with the concentration in the above range can effectively increase the stability of the electrolyte liquid at a high voltage, inhibit gas generation, and increase the cycling capacity retention rate of the lithium battery.

When the concentration of the electrolyte additive is smaller than 1.0 wt %, the content of the electrolyte additive is relatively low, and a uniform film is difficult to be formed on the electrode. When the concentration of the electrolyte additive is larger than 3.0 wt %, the film formed on the cathode or the anode due to the decomposition of the electrolyte additive is relatively thick, greatly affecting the migration and the intercalation/deintercalation of the lithium ions, and the performance of the lithium battery will become poor. In an embodiment, the concentration of the electrolyte additive is 2.0 wt %. With this concentration, the electrolyte additive can play a best role in inhibiting gas generation at a high voltage and maintaining the cycling capacity retention rate of the lithium battery.

Further, in the electrolyte liquid according to the present disclosure, the electrolyte lithium salt can include lithium hexafluorophosphate (LiPF$_6$), lithium tetrafluoroborate (LiBF$_4$), lithium bis(oxalate)borate (LiBOB), lithium difluorophosphate (LiF$_2$PO$_2$), lithium bis(fluorosulfonyl)imide (LiFSI), lithium bis(trifluoromethylsulfonyl)imide (LiTFSI), lithium difluoro(oxalato)borate (LiODFB), lithium difluorobis(oxalato)phosphate (LiODFP), or any combination thereof. In the present disclosure, the electrolyte lithium salt can be any electrolyte lithium salt commonly used in an electrolyte liquid of a lithium battery, and can be selected by those skilled in the art according to actual needs. The electrolyte additive according to the present disclosure is appropriate to be used with any one of the above-described electrolyte lithium salts and thus has a wide range of application.

Further, in the electrolyte liquid according to the present disclosure, the concentration of the electrolyte lithium salt in the electrolyte liquid can be in a range of 0.8 mol/L to 1.2 mol/L, for example, can be 0.8 mol/L, 0.85 mol/L, 0.9 mol/L, 0.95 mol/L, 1.0 mol/L, 1.05 mol/L, 1.1 mol/L, 1.15 mol/L, or 1.2 mol/L, or any other specific value in the above range. When the concentration of the electrolyte lithium salt is smaller than 0.8 mol/L, the concentration of the lithium ions in the electrolyte liquid is generally relatively low, so that the ionic conductivity of the electrolyte liquid is over low, thereby causing the decrease in the rate performance and the cycling performance of the battery. When the concentration of the electrolyte lithium salt is larger than 1.2 mol/L, some electrolyte lithium salts may be difficult to be dissolved, or may occur crystallization after dissolution during low temperature storage. Moreover, the over large concentration of the electrolyte lithium salt will make the viscosity of the electrolyte liquid too high and thus decrease the lithium ion conductivity, thereby narrowing the using window of the electrolyte liquid, weakening the infiltration capacity of the electrolyte liquid, and finally affecting the electrochemical performance of the battery. In an embodiment, the concentration of the electrolyte lithium salt in the electrolyte liquid is 1.0 mol/L.

Further, in the electrolyte liquid for the lithium battery according to the present disclosure, the organic solvent can include carbonate ester, carboxylate ester, and fluorocarboxylate ester, or any combination thereof. In the present disclosure, the organic solvent can be any organic solvent commonly used in an electrolyte liquid of a lithium battery, and can be selected by those skilled in the art according to actual needs. The electrolyte additive according to the present disclosure is appropriate to be used with any one of the above-described organic solvents and thus has a wide range of application.

The carbonate ester can include dimethyl carbonate, diethyl carbonate, ethylene carbonate, propylene carbonate, ethylmethyl carbonate, butylene carbonate, methylpropyl carbonate, or any combination thereof.

The carboxylate ester can include ethyl formate, ethyl acetate, propyl acetate, butyl acetate, propyl propionate, butyl propionate, ethyl butyrate, methyl formate, ethyl propionate, or any combination thereof.

The fluorocarboxylate ester can include ethyl fluoroformate, ethyl fluoroacetate, propyl fluoroacetate, butyl fluoroacetate, ethyl fluoropropionate, propyl fluoropropionate, butyl fluoropropionate, ethyl fluorobutyrate, methyl fluoroformate, or any combination thereof.

Further, in the electrolyte liquid for the lithium battery according to the present disclosure, the electrolyte liquid can further include a film-formation additive. The film-formation additive can include fluoroethylene carbonate (FEC), 1,3-propanesultone (PS), 1,4-butanesultone (BS), vinylene carbonate (VC), or any combination thereof. It is to be understood that by adding the above additive into the electrolyte liquid, it is helpful for the formation of a stable SEI film on the surface of the electrode plate of the battery, and the SEI film has a compact structure and does not increase impedance, so that the cycling stability of the lithium battery is further improved.

Further, in the electrolyte liquid for the lithium battery according to the present disclosure, the concentration of the film-formation additive in the electrolyte liquid can be in a range of 0.2 wt % to 4.0 wt %, for example, can be 0.2 wt %, 0.4 wt %, 0.6 wt %, 0.8 wt %, 1.0 wt %, 1.2 wt %, 1.4 wt %, 1.6 wt %, 1.8 wt %, 2.0 wt %, 2.2 wt %, 2.4 wt %, 2.6 wt %, 2.8 wt %, 3.0 wt %, 3.2 wt %, 3.4 wt %, 3.6 wt %, 3.8 wt %, or 4.0 wt %, or any other specific value in the above range. With the concentration in the above range, the film-formation additive can improve the formability of the SEI film.

In a third aspect, the present disclosure provides an electrochemical device including a cathode, an anode, a separator, and an electrolyte.

The cathode includes a cathode current collector and a cathode active material layer disposed on a surface of the cathode current collector.

The anode includes an anode current collector and an anode active material layer disposed on a surface of the anode current collector.

The separator is disposed between the cathode and the anode.

The electrolyte liquid can be the electrolyte liquid for the lithium battery according to the second aspect of the present disclosure.

In an optional embodiment of the present disclosure, the electrochemical device can be a lithium battery, such as a lithium ion battery, a lithium metal battery, etc.

In an optional embodiment of the present disclosure, the cathode current collector can be metal aluminum, but the present disclosure is not limited thereto.

In an optional embodiment of the present disclosure, the cathode active material layer can include a cathode active material, a binder, and a conducting agent.

In an optional embodiment of the present disclosure, the cathode active material can include lithium cobalt oxide ($LiCoO_2$), lithium nickel cobalt manganese oxide ternary material (NCM), lithium nickel cobalt aluminum oxide ternary material (NCA), lithium iron phosphate, lithium manganese iron phosphate, lithium manganate, or any combination thereof, but the present disclosure is not limited thereto.

In an optional embodiment of the present disclosure, the anode current collector can be metal copper, but the present disclosure is not limited thereto.

In an optional embodiment of the present disclosure, the anode active material layer can include an anode active material, a binder, and a conducting agent.

In an optional embodiment of the present disclosure, the anode active material can include lithium metal or lithium metal alloy compound, carbon material, graphite material, silicon carbon material, silicon material, silicon oxygen material, or any combination thereof, but the present disclosure is not limited thereto.

In an optional embodiment of the present disclosure, the binder that can be used in the cathode active material layer and the binder that can be used in the anode active material layer can independently include polyvinylidene fluoride (PVDF), polytetrafluoroethylene (PTFE), styrene butadiene rubber (SBR), carboxymethyl cellulose (CMC), polyacrylic acid (PAA), polyacrylonitrile (PAN), polyacrylate, or any combination thereof, but the present disclosure is not limited thereto.

In an optional embodiment of the present disclosure, the conducting agent that can be used in the cathode active material layer and the conducting agent that can be used in the anode active material layer can independently include carbon black, conductive graphite, carbon nanotubes (CNT), carbon fibers (VGCF), graphene, acetylene black (AB), Ketjen black (KB), or any combination thereof, but the present disclosure is not limited thereto.

The present disclosure further provides an electrical device including the electrochemical device according to the third aspect of the present disclosure.

The electrolyte additive according to the present disclosure can inhibit the gas generation of the electrolyte liquid at a relatively high temperature and a relatively operating voltage, and thus can maintain the cycling stability of the electrolyte liquid relatively high. Therefore, the electrolyte liquid of the lithium battery containing the electrolyte additive according to the present disclosure can maintain a relatively high cycling stability even at a relatively high temperature (e.g., 45° C.) and a relatively high operating voltage (e.g., charging voltage of 4.5 V), without obvious gas generation phenomenon occurring, so that the corresponding lithium battery can still have a relatively high cycling capacity retention rate after hundreds of charge-discharge cycles. Moreover, the safety of the lithium battery in case of overcharge can be effectively improved.

The technical solution of the present disclosure will be described by way of example through the following specific embodiments.

Compounds used in the present disclosure are all available commercially or purchasable from the market. Those skilled in the art can obtain the compounds commercially in the market according to needs.

EXAMPLES

Example 1-1

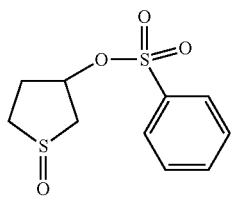

Compound 1

A solvent mixture of ethylene carbonate (EC), ethylmethyl carbonate (EMC), and dimethyl carbonate (DMC) with a weight ratio of 1:1:1 is used as an organic solvent of an electrolyte liquid for a lithium battery. Lithium hexafluorophosphate ($LiPF_6$), vinylene carbonate (VC), fluoroethylene carbonate (FEC), and compound 1 which is an embodiment of the electrolyte additive according to the present disclosure are added into the solvent mixture in such a way that $LiPF_6$ has a concentration of 1.0 mol/L, VC and FEC each have a concentration of 2.5 wt %, and compound 1 has a concentration of 1.0 wt %, thereby obtaining the electrolyte liquid for the lithium battery.

Example 1-2

An electrolyte liquid for a lithium battery is made by the same method as Example 1-1, except that the concentration of compound 1 is 2.0 wt %.

Example 1-3

An electrolyte liquid for a lithium battery is made by the same method as Example 1-1, except that the concentration of compound 1 is 3.0 wt %.

Example 2-1

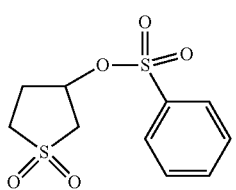

Compound 2

An electrolyte liquid for a lithium battery is made by the same method as Example 1-1, except that compound 1 is replaced with compound 2 as an embodiment of the electrolyte additive according to the present disclosure.

Example 2-2

An electrolyte liquid for a lithium battery is made by the same method as Example 2-1, except that the concentration of compound 2 is 2.0 wt %.

Example 2-3

An electrolyte liquid for a lithium battery is made by the same method as Example 2-1, except that the concentration of compound 2 is 3.0 wt %.

Example 3-1

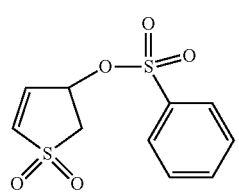

Compound 3

An electrolyte liquid for a lithium battery is made by the same method as Example 1-1, except that compound 1 is replaced with compound 3 as an embodiment of the electrolyte additive according to the present disclosure.

Example 3-2

An electrolyte liquid for a lithium battery is made by the same method as Example 3-1, except that the concentration of compound 3 is 2.0 wt %.

Example 3-3

An electrolyte liquid for a lithium battery is made by the same method as Example 3-1, except that the concentration of compound 3 is 3.0 wt %.

Example 4-1

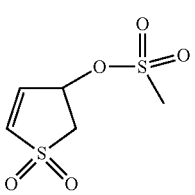

Compound 4

An electrolyte liquid for a lithium battery is made by the same method as Example 1-1, except that compound 1 is replaced with compound 4 as an embodiment of the electrolyte additive according to the present disclosure.

Example 4-2

An electrolyte liquid for a lithium battery is made by the same method as Example 4-1, except that the concentration of compound 4 is 2.0 wt %.

Example 4-3

An electrolyte liquid for a lithium battery is made by the same method as Example 4-1, except that the concentration of compound 4 is 3.0 wt %.

Comparative Example 1

An electrolyte liquid for a lithium battery is made by the same method as Example 1-1, except that the electrolyte additive according to the present disclosure is not included.

Comparative Example 2

An electrolyte liquid for a lithium battery is made by the same method as Example 1-1, except that the concentration of compound 1 is 0.5 wt %.

Comparative Example 3

An electrolyte liquid for a lithium battery is made by the same method as Example 1-1, except that the concentration of compound 1 is 3.5 wt %.

Comparative Example 4

An electrolyte liquid for a lithium battery is made by the same method as Example 2-1, except that the concentration of compound 2 is 0.5 wt %.

Comparative Example 5

An electrolyte liquid for a lithium battery is made by the same method as Example 2-1, except that the concentration of compound 2 is 3.5 wt %.

Comparative Example 6

An electrolyte liquid for a lithium battery is made by the same method as Example 3-1, except that the concentration of compound 3 is 0.5 wt %.

Comparative Example 7

An electrolyte liquid for a lithium battery is made by the same method as Example 3-1, except that the concentration of compound 3 is 3.5 wt %.

Comparative Example 8

An electrolyte liquid for a lithium battery is made by the same method as Example 4-1, except that the concentration of compound 4 is 0.5 wt %.

Comparative Example 9

An electrolyte liquid for a lithium battery is made by the same method as Example 4-1, except that the concentration of compound 4 is 3.5 wt %.

Comparative Example 10

An electrolyte liquid for a lithium battery is made by the same method as Example 1-1, except that sulfolane is used as an electrolyte additive, and the concentration of sulfolane is 2 wt %.

Test Examples

A plurality of lithium ion batteries are made, with $LiNi_{0.6}Co_{0.2}Mn_{0.2}O_2$ plates as cathodes, synthetic graphite plates as anodes, and polypropylene (PP) membranes with a thickness of 16 μm as separators, and respectively injected with the electrolyte liquids according to the present disclosure made in the above Examples 1-1 to 4-3 and the electrolyte liquids made in Comparative Examples 1 to 10. The obtained lithium ion batteries are separately subjected to the following performance tests.

1. High Temperature Cycling Test

At 45° C., each obtained lithium ion battery is separately charged at a constant current of 1C to a charge cut-off voltage of 4.5V, and then charged at a constant voltage of 4.5V to a current of 0.05C. Thereafter, the lithium ion battery is separately discharged at a constant current of 1.5 C to 2.8V. The charge-discharge process is cycled with the conditions as described above. The retention rate (%) of the cycling discharge capacity of the battery after 500 cycles with respect to the cycling discharge capacity of the battery in the first cycle is measured, the gas generation of the battery after the 500 cycles is qualitatively observed, and the results are listed in the following Table 1.

TABLE 1

| | Cycling capacity retention rate | Gas generation |
|---|---|---|
| Example 1-1 | 85.7% | No obvious gas generation |
| Example 1-2 | 86.9% | No obvious gas generation |
| Example 1-3 | 85.2% | No obvious gas generation |
| Example 2-1 | 86.2% | No obvious gas generation |
| Example 2-2 | 87.3% | No obvious gas generation |
| Example 2-3 | 85.9% | No obvious gas generation |
| Example 3-1 | 86.4% | No obvious gas generation |
| Example 3-2 | 87.8% | No obvious gas generation |
| Example 3-3 | 86.2% | No obvious gas generation |
| Example 4-1 | 85.3% | No obvious gas generation |
| Example 4-2 | 86.5% | No obvious gas generation |
| Example 4-3 | 84.6% | No obvious gas generation |
| Comparative Example 1 | 62.3% | Obvious gas generation |
| Comparative Example 2 | 81.6% | Gas generation exists, and gas amount is smaller than that in Comparative Example 1 |
| Comparative Example 3 | 84.1% | No obvious gas generation |
| Comparative Example 4 | 82.3% | Gas generation exists, and gas amount is smaller than that in Comparative Example 1 |
| Comparative Example 5 | 84.7% | No obvious gas generation |
| Comparative Example 6 | 83.1% | Gas generation exists, and gas amount is smaller than that in Comparative Example 1 |
| Comparative Example 7 | 85.1% | No obvious gas generation |
| Comparative Example 8 | 81.3% | Gas generation exits, and gas amount is smaller than that in Comparative Example 1 |
| Comparative Example 9 | 83.8% | No obvious gas generation |
| Comparative Example 10 | 78.2% | No obvious gas generation |

As shown in Table 1, the ordinary electrolyte liquid in Comparative Example 1 is oxidatively decomposed and generates a large amount of gas under the charging condition that the charging voltage is 4.5V. As the electrolyte liquid is decomposed and gas is generated, the performance of the battery is gradually deteriorated. Whereas, the electrochemical window of the electrolyte liquid can be expanded by adding the specified amount of electrolyte additive (any one of Examples 1-1 to 4-3) according to the present disclosure, so that the oxidation resistance of the whole electrolyte liquid at the high voltage is increased, and no obvious gas generation caused by the decomposition occurs even if the battery is charged to 4.5V. In addition, as shown in Comparative Examples 2 to 9, if the amount of the electrolyte additive according to present disclosure is out of the specific range disclosed in the present disclosure, then it is difficult to balance the performance of inhibiting the gas generation and the performance of maintaining the cycling capacity retention. If the amount of the additive is relatively low, the gas generation cannot be sufficiently inhibited, while if the amount of the additive is relatively high, the cycling capacity retention rate of the battery will decrease though the gas generation can be effectively inhibited. Moreover, as shown in Comparative Example 1, when sulfolane, which is one of the sulfone additives commonly used in the art, is added to the electrolyte liquid, the performance in maintaining the cycling capacity retention rate of the battery is significantly poor than the Examples according to the present disclosure although the gas generation can be inhibited.

2. Overcharge Test

At room temperature of 25° C., each battery is separately charged at a constant current of 1C to a charge cut-off voltage of 4.2V, and then charged at a constant voltage to a current of 0.05C. Thereafter, the battery which has been fully charged is overcharged at the constant current of 1C for 60 min, to observe if phenomenons such as liquid leakage, smoking, burning, and explosion occur. The results are shown in the following Table 2.

TABLE 2

| | Overcharge test result |
|---|---|
| Example 1-1 | The battery passed the overcharge test and swelled slightly, and the anti-explosion valve was not opened. |
| Example 1-2 | The battery passed the overcharge test and swelled slightly, and the anti-explosion valve was not opened. |
| Example 1-3 | The battery passed the overcharge test and swelled slightly, and the anti-explosion valve was not opened. |
| Example 2-1 | The battery passed the overcharge test and swelled slightly, and the anti-explosion valve was not opened. |
| Example 2-2 | The battery passed the overcharge test and swelled slightly, and the anti-explosion valve was not opened. |
| Example 2-3 | The battery passed the overcharge test and swelled slightly, and the anti-explosion valve was not opened. |
| Example 3-1 | The battery passed the overcharge test and swelled slightly, and the anti-explosion valve was not opened. |
| Example 3-2 | The battery passed the overcharge test and swelled slightly, and the anti-explosion valve was not opened. |
| Example 3-3 | The battery passed the overcharge test and swelled slightly, and the anti-explosion valve was not opened. |
| Example 4-1 | The battery passed the overcharge test and swelled slightly, and the anti-explosion valve was not opened. |
| Example 4-2 | The battery passed the overcharge test and swelled slightly, and the anti-explosion valve was not opened. |
| Example 4-3 | The battery passed the overcharge test and swelled slightly, and the anti-explosion valve was not opened. |
| Comparative Example 1 | The anti-explosion valve was opened early, leading to leakage of liquid, but no fire or explosion was observed. |
| Comparative Example 2 | The battery passed the overcharge test and swelled, and the anti-explosion valve was not opened. |
| Comparative Example 3 | The battery passed the overcharge test with no obvious swelling, and the anti-explosion valve was not opened. |
| Comparative Example 4 | The battery passed the overcharge test and swelled, and the anti-explosion valve was not opened. |
| Comparative Example 5 | The battery passed the overcharge test with no obvious swelling, and the anti-explosion valve was not opened. |
| Comparative Example 6 | The battery passed the overcharge test and swelled, and the anti-explosion valve was not opened. |
| Comparative Example 7 | The battery passed the overcharge test with no obvious swelling, and the anti-explosion valve was not opened. |
| Comparative Example 8 | The battery passed the overcharge test and swelled, and the anti-explosion valve was not opened. |
| Comparative Example 9 | The battery passed the overcharge test with no obvious swelling, and the anti-explosion valve was not opened. |
| Comparative Example 10 | The battery passed the overcharge test and swelled, and the anti-explosion valve was not opened. |

As shown in the above Table 2, as compared to the lithium ion battery including no electrolyte additive according to the present disclosure in Comparative Example 1, the lithium ion batteries including the electrolyte additives in the Examples 1-1 to 4-3 of the present disclosure generate a small amount of gas in overcharge and thus have a relatively high safety. Whereas, liquid leakage has occurred in Comparative Example 1, suggesting that obvious gas generation occurs in overcharge. In addition, in Comparative Examples 2 to 9, the amount of the electrolyte additives according to the present disclosure is out of the specific range of the present disclosure. When the amount of additives is relatively small, gas generation cannot be sufficiently inhibited, causing swelling of the batteries. When the amount of additives is relatively large, the gas generation can be effectively inhibited, so that there is no obvious swelling of the batteries. However, as shown in Table 1, the cycling performance of the batteries decreases. Moreover, the increased amount of additives also increased the costs. Sulfolane, as an ordinary sulphone additive, is used in Comparative Example 10. It is observed in the overcharge of the battery in Comparative Example 10 that the amount of gas generated is slightly increased and the swelling degree of the battery is greater as compared to Examples 1-1 to 4-3 according to the present disclosure. As shown in Table 1, the cycling performance of the battery including sulfolane is also poor than the batteries in Examples 1-1 to 4-3 of the present disclosure.

The above-described embodiments are only several implementations of the present application, and the descriptions are relatively specific and detailed, but they should not be construed as limiting the scope of the present application. It should be understood by those of ordinary skill in the art that various modifications and improvements can be made without departing from the concept of the present application, and all fall within the protection scope of the present application. Therefore, the patent protection of the present application shall be defined by the appended claims.

What is claimed is:

1. An electrolyte, comprising a lithium salt, an organic solvent, and an additive comprising:
   a compound represented by a formula (I):

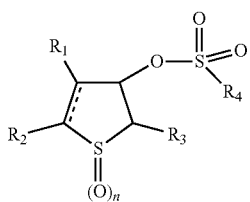

wherein $R_1$, $R_2$, $R_3$, and $R_4$ are identical to or different from each other, and are independently selected from a group consisting of hydrogen, halogen, substituted or unsubstituted $C_1$-$C_{20}$ alkyl, and substituted or unsubstituted $C_6$-$C_{18}$ aryl, and wherein a substituent of the substituted or unsubstituted $C_1$-$C_{20}$ alkyl or the substituted or unsubstituted $C_6$-$C_{18}$ aryl is halogen, $C_1$-$C_{20}$ alkyl, or $C_6$-$C_{18}$ aryl;

wherein ------ denotes a single bond or a double bond; and wherein n is 1.

2. The electrolyte of claim 1, wherein a concentration of the additive in the electrolyte is 1.0 wt % to 3.0 wt %.

3. The electrolyte of claim 1, wherein the lithium salt is at least one selected from a group consisting of lithium hexafluorophosphate, lithium tetrafluoroborate, lithium bis(oxalate)borate, lithium difluorophosphate, lithium bis(fluorosulfonyl)imide, lithium bis(trifluoromethylsulfonyl)imide, lithium difluoro(oxalato)borate, lithium difluorobis(oxalato) phosphate, and any combination thereof.

4. The electrolyte of claim 1, wherein a concentration of the lithium salt in the electrolyte is 0.8 mol/L to 1.2 mol/L.

5. The electrolyte of claim 1, wherein the organic solvent is at least one selected from a group consisting of carbonate ester, carboxylate ester, fluorocarboxylate ester, and any combination thereof.

6. The electrolyte of claim 5, wherein the carbonate ester is at least one selected from a group consisting of dimethyl carbonate, diethyl carbonate, ethylene carbonate, propylene carbonate, ethylmethyl carbonate, butylene carbonate, methylpropyl carbonate, and any combination thereof.

7. The electrolyte of claim 5, wherein the carboxylate ester is at least one selected from a group consisting of ethyl formate, ethyl acetate, propyl acetate, butyl acetate, propyl propionate, butyl propionate, ethyl butyrate, methyl formate, ethyl propionate, and any combination thereof.

8. The electrolyte of claim 5, wherein the fluorocarboxylate ester is at least one selected from a group consisting of ethyl fluoroformate, ethyl fluoroacetate, propyl fluoroacetate, butyl fluoroacetate, ethyl fluoropropionate, propyl fluoropropionate, butyl fluoropropionate, ethyl fluorobutyrate, methyl fluoroformate, and any combination thereof.

9. The electrolyte of claim 1, further comprising a film-formation additive which is at least one selected from a group consisting of fluoroethylene carbonate, 1,3-propanesultone, 1,4-butanesultone, vinylene carbonate, and any combination thereof.

10. The electrolyte of claim 9, wherein a concentration of the film-formation additive in the electrolyte is 0.2 wt % to 4.0 wt %.

11. An electrochemical device, comprising:
a cathode comprising a cathode current collector and a cathode active material layer disposed on a surface of the cathode current collector;
an anode comprising an anode current collector and an anode active material layer disposed on a surface of the anode current collector;
a separator disposed between the cathode and the anode; and
the electrolyte of claim 1.

12. The electrochemical device of claim 11, wherein the electrochemical device is a lithium battery.

13. The electrochemical device of claim 12, the lithium battery is a lithium ion battery or a lithium metal battery.

\* \* \* \* \*